OR 3,350,156

Oct. 31, 1967 D. P. ADAMS 3,350,156

NOMOGRAPHIC COMPUTER SCANNING MEANS

Filed March 4, 1964 2 Sheets-Sheet 1

INVENTOR.
DOUGLAS P. ADAMS

BY Wade Koontz and Sherman H. Goldman

ATTORNEYS

Oct. 31, 1967 D. P. ADAMS 3,350,156

NOMOGRAPHIC COMPUTER SCANNING MEANS

Filed March 4, 1964 2 Sheets-Sheet 2

INVENTOR.
DOUGLAS P. ADAMS
BY Wade Koontz and Sherman H. Goldman
ATTORNEYS

United States Patent Office 3,350,156 Patented Oct. 31, 1967

3,350,156
NOMOGRAPHIC COMPUTER SCANNING MEANS

Douglas P. Adams, Cambridge, Mass., assignor to the United States of America as represented by the Secretary of the Air Force Filed Mar. 4, 1964, Ser. No. 349,512
4 Claims. (Cl. 350—202)

ABSTRACT OF THE DISCLOSURE

A nomographic computer scanning means for presentation of a light picture of a film memory containing countable bits thereon, wherein the film memory is fixed and a moving optical retrieval system provides for high speed reading. The retrieval system utilizes a rotatable dove prism and an associated lens arrangement which receives light energy which was projected through the film memory. A lens system which rotates at twice the speed of the dove prism and associated lens arrangement is provided for directing the light energy from the film memory to the dove prism and associated lens arrangement.

This invention relates generally to film scanners and, more particularly, to a machine which reads countable bits recorded on film to accord with solutions of a nomogram.

Nomography has been combined with electronics to form an automatic, digital-graphical hybrid known as a nomographic computer. A nomogram has a scale for each variable represented wherein each scale has a single value or a set of values associated with every point thereon by express or implied computation. Conversely, the associated value would cause the point to be placed in its position on its scale in order to imply the value to the observer. The nomogram is capable of being converted to a pattern of marks recorded on film or magnetic tape which is capable of being read by photoelectric cells or tape reading means such that a digital counting system may be utilized to compute desired values for a particular equation represented by a bit nomogram. This invention concerns the reading of such bit memories by optical-mechanical means.

Previously, an optical-mechanical system for reading bit memories involved the utilization of film having silvered bits thereon and arranged around a moving light system such that the light was reflected from the silvered bits on the film to a photo-electric circuit, both being mounted on a control column. This device provided poor reflection, and light diffusion and diffraction patterns resulted at high speed densities such that the integrity of the bit pattern was destroyed, thereby rendering the reading system unusable.

By utilizing a fixed memory device the moving optical retrieval system of this invention provides relatively high speed reading. The device is not only compact, but is able to utilize a memory length which contains a significant amount of information. In addition, the device is reliable and has the ability to serve as a testing apparatus for the computing element used with the system. The access time to any bit of information is very small and is set by the associated circuitry.

Accordingly, it is a primary object of this invention to provide a film scanning device which uses a moving optical retrieval system and a fixed memory device.

It is another object of this invention to provide a compact film scanning system which provides high speed operation with film strips having countable bits thereon in rasters.

It is still another object of this invention to provide a film scanning system which enables the utilization of high bit densities on a fixed film memory device.

It is a further object of this invention to provide a film scanning device which utilizes conventional, currently available materials that lend themselves to standard mass production manufacturing techniques.

Figure 1:
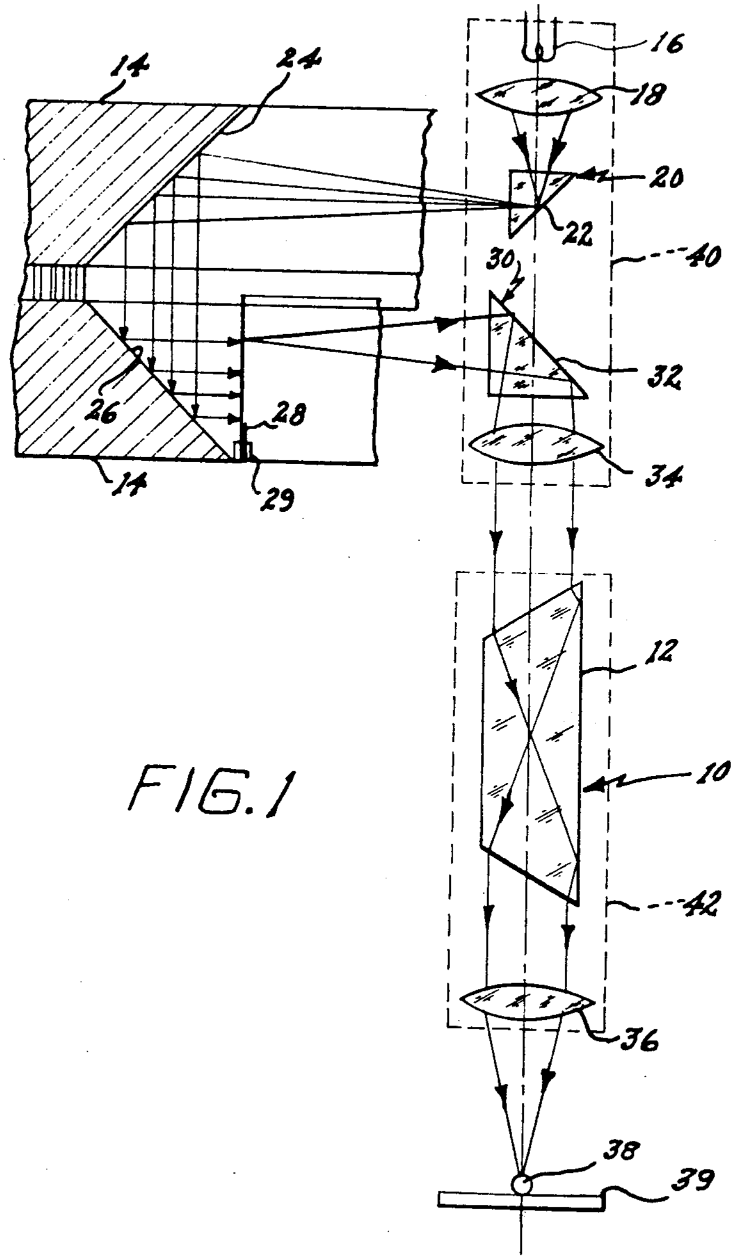
Figure 2:
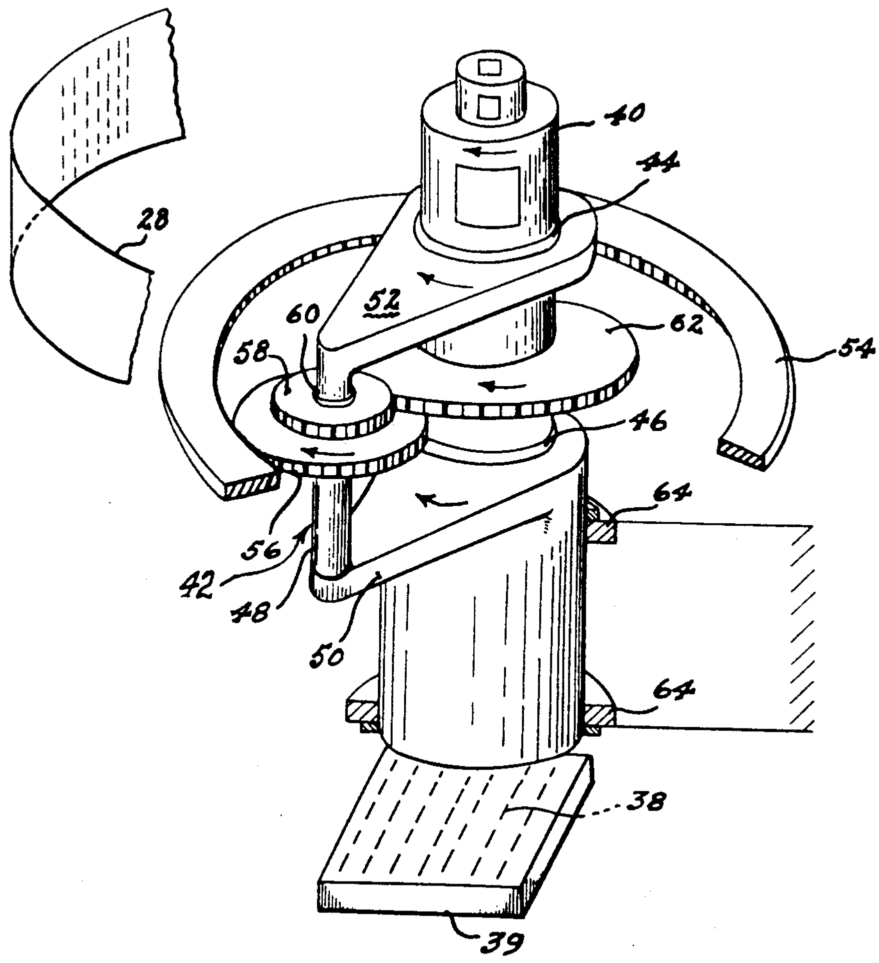

These and other advantages, features and objects of the invention will become more apparent from the following description taken in connection with the illustrative embodiment in the accompanying drawings, wherein:

FIGURE 1 is a schematic diagram of the optical system for a fixed memory moving optics system; and FIGURE 2 is a partially schematic representation of the component arrangement for producing the desired speed relationship between the various portions of the moving optical system.

Referring to FIGURE 1, there is shown a schematic of the optical path of light in the fixed memory, moving optics system of this invention. The heart of the system is a dove prism 10 which is a conventional trapezoidal prism, the use of which differs in no way from its use in panoramic scanners of the type utilized in modern tanks and submarines. The prism 10 orients the image field for an observer regardless of the direction orientation of the scanning head in which it is mounted relative to the observer. The dove prism has a reflecting surface 12 such that the prism takes light approximately parallel to its axis and causes it to undergo one mirror reflection prior to leaving parallel to the axis.

An explanation of the theory involved with the utilization of a dove prism may be found in the article entitled "Countable-bit Nomographic Electronic Computation—Noel," by Douglas P. Adams, which appears in the book "Workshop on Computer Organization," by Spartan Books, Inc., copyright 1963. In addition, an explanation of nomograms and films containing the bits of information which are utilized with the reading device of this invention may also be found in said article.

The elements on the vertical optical axis shown in FIGURE 1 are mounted for relative rotation as will be described relative to FIGURE 2. The fixed memory is arranged in a circle with the optical axis at its center and comprises a slightly diffusing plexiglass double cone reflector 14, the apeces of which lie on the vertical optical axis and a film holder 29 which supports and positions the film 28. Only that portion of the field being scanned is illuminated and this is performed by presenting the light from a high powered light source 16 through an illuminating lens 18 for projection to an illuminating prism 20 which has a reflecting surface 22. Mirror surfaces at 24 and 26 of the double conical reflector 14 receive light from the reflecting surface 22 of the illuminating prism 20 and presents the rays to the rear side of the circularly arranged film 28 which contains the bit memory by having the bits of information applied thereon in rasters, i.e., evenly spaced rulings or columns of bits.

The bits could either be cutouts in an opaque piece of film 28 or, alternatively, could be clear, transparent portions on an opaque field. The light which emanates from a clear portion on the film is presented to a scanning prism 30 which has a reflecting surface at 32. Since the dove prism 10 is required to be operated only on nearly parallel light, the scanning prism 30 has its focal point on the film. The film 28 could be mounted by means of an extension of the double conical reflector 14 shown at 29 or, alternatively, a separate film mounting cylinder could be provided. The rays which have been applied through the film 28 to the scanning prism are projected through a lens 34 which takes the light and projects it parallel to the axis of the lens system to the dove prism 10 which, in accordance with the principles expounded in the aforementioned article, applies the resultant beams to a projector lens 36 which presents the image at 38 to a photomultiplier bank 39 in order to provide electrical pulses for the computing element.

Thus, the aforementioned optical system provides a source of illumination which has the light emitted to and directed by an illuminating lens to an illuminating prism. The prism directs the light to a pair of slightly diffusing, plexiglass reflector surfaces which direct the rays down from one reflector face to the opposite reflector face in order to have the light enter a film cylinder or holder to be projected through the film with slots which indicate bits of information. The light emanating from the slots is applied to a scanning prism and reflected therefrom to a rotating lens which applies focal rays of light to a dove prism, the exit beams from which are applied to a fixed lens which focuses the rays to a point which results in an image indicating the bit from the film.

The presentation of bits from the film 28 onto the final field at 38 has a motion parallel to itself in translation as the members 22, 30 and 10 turn; the rotation of the image being eliminated by the dove prism as explained in the aforementioned article. It is clear that the elimination of the rotational effect is achieved by rotating the prism 10 at one-half the speed of the scanning elements 20 and 30.

FIGURE 2 illustrates in a somewhat schematic form the component arrangement which would provide a 2:1 ratio between a scanning head 40 and a dove prism holder 42 which also provides a mount for the planetary gearing system to achieve the desired ratio. Smanning head 40, therefore, provides a mounting means for the bulb 16, illuminating lens 18 scanning or, illuminating prism 20, scanning prism 30 and lens 34. Holder 42 provides a mount for the dove prism 10 and lens 36. Conventional mounting means would be utilized within scanning head 40 and holder and 42 for maintaining the components in their proper relative relationship.

The light source 16 and lenses 18, 34 and 36 need not be mounted for rotation with the remaining elements of the optical system since their rotation does not effect the end result; however, for convenience of construction these lenses and light source are mounted, as described, in their appropriate holders. The light source 16 and lenses 18 and 36, for example, could be external of the entire device and fixed while lens 34 could be mounted in the dove prism holder 42.

Arrows on FIGURE 2 indicate the direction of rotation of the elements with the desired 2:1 ratio between the scanning head 40 and the dove prism holder 42 maintained to avoid rotational displacement of the optical image caused by scanning head rotation.

The scanning head 40 rides in a bearing 44 which is formed as a part of the holder 42. An additional bearing 46 is provided at the top of the bottom portion of the dove prism holder 42 for easy rotation of the scanning head 40 within. The dove prism holder 42 also functions as planetary gear mount and is shaped in the form of a yoke which has a vertical portion 48 orientated parallel to the optical axis of the system. Arms 50 and 52 complete the yoke connection of 48 with the bottom portion of the dove holder for rotation therewith.

Although a single planetary gear set is shown, it should be understood that in practice, three planetary gear sets would be utilized such that the same moment of inertia about any diametrical axis would be provided in order to minimize vibration. By resting the scanning head 40 through the bearings 44 and 46 in the dove prism holder 42, high speed, large diameter bearings are eliminated. A fixed ring gear 54 is provided to mesh with a planet gear set 56, 58 which is arranged to rotate on a bearing 60 on vertical arm 48. Thus, rotation of the dove prism in the direction of the arrow on the arms 50, 52 causes a rotation of gears 58, 60 in the direction of the arrow on gear 56. A sun gear 62 which is fixed to the scanning head 40 would be rotated in a clockwise direction as indicated by its arrow. Thus, both the scanning head 40 and the dove prism holder and planet gear mount 42 are rotated in the same direction with a 2:1 ratio. A pair of bearings 64 would be provided in a fixed support in order to maintain the orientation of the device and allow for rotation of holder 42.

It is contemplated that the drive for the unit could be applied in a conventional manner and could be either an electric motor or a pneumatic turbine wheel arrangement to the scanning head 40. The drive means, however, could be applied to either the scanning head 40 or the dove prism tube 42.

The device has been built with an optical path from film to photomultiplier of 23 inches and the unit has been operated at a speed ratio of 20,000 to 10,000 r.p.m. with bit densities approaching 250 bits per inch.

Thus, there has been described a film scanner which utilizes a fixed memory and a moving optical retrieving system which allows the entire optical path to be sealed from other components, and the mechanical drive to be sealed with respect to the atmosphere, lubrication being provided by a conventional oil pump. The resultant image from the afore-described device is applied to a photomultiplier 39 which counts the bits and applies the information to a digital computer for achieving a solution.

Although the invention has been described with reference to a particular embodiment, it will be understood to those skilled in the art that the invention is capable of a variety of alternative embodiments within the spirit and scope of the appended claims.

I claim:

1. A nomographic computer scanning means for presentation of a light picture of a film containing countable bits thereon comprising a source of light, a double conical reflector having first and second annular reflecting surfaces, means for directing light from said source to said first surface, said double conical reflector arranged to receive said light on said first surface and reflect it to said second surface for transmission in a direction parallel to the original direction of reception of said light, a cylindrically arranged fixed film memory in the path of said light from said second reflecting surface, and a central optical system concentric with said fixed film memory; said central optical system comprising a rotatable scanning prism for directing light from a portion of said film memory along the axis of said cylindrically arranged fixed film memory, a rotatable dove prism on said axis in the path of the light from said scanning prism, means for rotating said dove prism at a speed half that of said scanning prism and means cooperating with said prisms for producing an image of said portion of said film memory; said means for directing light from said source and said scanning prism being so arranged that the portion of the film memory being scanned is always illuminated.

2. A scanning means as defined in claim 1 wherein said means for producing an image of said portion of said film memory comprises a first lens positioned between said scanning prism and said dove prism for collimating the light coming from said portion of said film memory, and a second lens positioned after said dove prism for focussing the collimated light coming from said dove prism whereby an image of said countable bits on the portion of the film memory being scanned is formed.

3. A scanning means as defined in claim 2 wherein said first and second lenses are fixedly disposed.

4. A scanning means as defined in claim 1 wherein said light source, said means for directing light from said source and said scanning prism are connected for simultaneous rotation.

References Cited

UNITED STATES PATENTS 2,966,096 12/1960 D'Incerti ----------- 350—23

Goetz et al.: IBM Technical Disclosure Bulletin, vol. 6, No. 8, p. 122, January 1964.

DAVID H. RUBIN, *Primary Examiner.*

JEWELL H. PEDERSEN, *Examiner.*

R. J. STERN, *Assistant Examiner.*